United States Patent
Rinehart

(10) Patent No.: US 6,782,128 B1
(45) Date of Patent: Aug. 24, 2004

(54) EDITING METHOD FOR PRODUCING A DOLL HAVING A REALISTIC FACE

(76) Inventor: Diane Rinehart, 3239 Cismont Colurt, Woodbridge, VA (US) 22192

(*) Notice: Subject to any disclaimer, the term of this patent is extended or adjusted under 35 U.S.C. 154(b) by 678 days.

(21) Appl. No.: 09/628,014

(22) Filed: Jul. 28, 2000

(51) Int. Cl.$^7$ .............................. G06K 9/46; G06K 9/54; A63H 3/02; A63H 3/36

(52) U.S. Cl. .......................... 382/167; 382/283; 446/97; 446/372; 446/391; 345/629

(58) Field of Search ................................ 382/162, 167, 382/118, 154, 274, 285, 282, 283, 294, 305; 446/391, 321, 372, 268, 97; 156/58, 59; 345/629, 630, 632, 633, 634, 640, 646, 647; 348/582, 584, 586, 587, 597, 598, 599

(56) References Cited

U.S. PATENT DOCUMENTS

| | | | |
|---|---|---|---|
| 4,659,319 A | * 4/1987 | Blair | 446/87 |
| 4,929,213 A | 5/1990 | Morgan | 446/97 |
| 4,975,969 A | * 12/1990 | Tal | 382/116 |
| 4,993,987 A | 2/1991 | Hull | 446/268 |
| 5,009,626 A | 4/1991 | Katz | 446/391 |
| 5,123,870 A | 6/1992 | Cahill | 446/372 |
| 5,141,466 A | 8/1992 | Catizone | 446/391 |
| 5,314,370 A | 5/1994 | Flint | 446/391 |
| 5,382,187 A | 1/1995 | Wilson | 446/391 |
| 5,403,224 A | 4/1995 | Gintling | 446/321 |
| 5,515,592 A | 5/1996 | Mills | 29/412 |
| 5,687,306 A | * 11/1997 | Blank | 345/634 |
| 5,779,516 A | 7/1998 | Thorne | 446/98 |
| 5,797,205 A | 8/1998 | Ferdinandsen et al. | 40/768 |
| 5,803,788 A | 9/1998 | Penberthy et al. | 446/391 |
| 6,175,403 B1 | * 1/2001 | Ikoma | 355/41 |
| 6,392,659 B1 | * 5/2002 | Ohki et al. | 345/630 |

OTHER PUBLICATIONS

English Abstract for JP 05345077 A, Dec. 27, 1993.*
Bouton et al, Inside Adobe Photoshop 5, 1998, New Riders Publishing, 1st ed, p 393 and 551–559.*
Haynes et al, Photoshop 5 Artistry: A Master Class for Photographers, Artists, and Production Artists, New Riders Publishing, 1998, p 76.*

* cited by examiner

Primary Examiner—Bhavesh M. Mehta
Assistant Examiner—Christopher Sukhaphadhana
(74) Attorney, Agent, or Firm—Kramer & Amado, P.C.

(57) ABSTRACT

A method for digitally editing an image of a real-life person for attaching the image to a soft-bodied doll having a generally planar face. The process includes electronically importing an image into a computer by use of a scanner, a digital camera, a compact disc, or an attachment to an e-mail, to produce a digital image file. The image is then digitally edited using any image editor. The face is masked while the neck of the person and background of the image are deleted. A portion of the person's cheek is then sampled and lightened slightly to form a neck color which then fills in the previously deleted portion. In a second embodiment, only the eyes, nose and mouth are masked while the rest of the image is either tinted to a chosen color corresponding to the color of fabric used in producing the doll, or partially erased to allow the chosen background color to blend through and create a color match between the facial images and the cloth body. In a third embodiment, the image is lightened in color to allow the color of the fabric used in producing the doll to bleed through the image. In this embodiment, the eyes and teeth are first whitened as much as possible. In a fourth embodiment, all areas of the photograph except the eyes, nose and mouth areas are removed and the resulting image is transferred to the face of the doll.

3 Claims, 3 Drawing Sheets

EDITING METHOD FOR PRODUCING A DOLL HAVING A REALISTIC FACE

BACKGROUND OF THE INVENTION

1. Field of the Invention

The present invention relates to a method of digitally editing a photograph in preparation for applying the photograph to the face of a doll.

2. Description of the Prior Art

Several prior art methods exist for making dolls having a face with an appearance of an actual person. However, most of these dolls are either hard to produce or very unrealistic in appearance. This is due to the lack of editing performed on the image before the image is applied to the doll. The following U.S. Patents are examples.

U.S. Pat. No. 5,403,224 issued to Gintling on Apr. 4, 1995 shows photograph face doll with a removable face pocket. It includes a doll having a pocket secured to the face portion for displaying a photograph. A photographic image of a person can be cut into a shape that fits within the pocket attached to the doll's face. In this manner, the doll is customizable. This method of customization is very easy for the owner of the doll to perform. However, it is not life-like and creates a picture frame like appearance.

U.S. Pat. No. 4,993,987 issued to Hull et al. on Feb. 19, 1991 shows a doll with a photographic image face. It is a doll having a personalized, photographic face impregnated in the material of which the doll is constructed using dye sublimation. It does not disclose any specific editing methods for the image before the image is placed on the doll through the process of sublimation.

U.S. Pat. No. 5,803,788 issued to Penberthy et al. on Sep. 8, 1998 shows a figurine having a sublimated image for a face. It states, "The present invention concerns a figurine with a picture image for a face, and in particular, to a ceramic figurine and process for producing a ceramic figurine which has a transferred photograph image for a face. Difficulties associated with dye sublimating a photographic or other image onto a three dimensional figure can be overcome by utilizing a substantially three dimensional representative head having a planar facial region. By utilizing a flat/planar facial region a standard flat heat press system may be utilized to sublimate an image into the coating of a ceramic figure. The resulting image is unexpectedly clear and lifelike with a smooth appearance and no sharp edges." This patent also includes a very thorough description of dolls designed to include life-like features. The following is another excerpt from that patent.

"Generally, a doll is a small representative figure of a human being and has traditionally been considered a child's toy. Dolls have been known since ancient times. In Europe, during the 15$^{th}$ century, "fashion dolls" which were given as gifts by monarchs and courtiers helped spread costume styles. Germany was noted for manufacture of wooden dolls during the 17$^{th}$ century and of china doll's heads during the 19$^{th}$ century. In Paris during the 18$^{th}$ century, dolls were manufactured that could speak and close their eyes. In the 19$_{th}$ century dolls were made of fabric, paper-mache, china, wax, hard rubber or bisque. By the 20$^{th}$ century doll manufacturing was an important U.S. industry.

"Dolls are not exclusively children's toys. Many individuals purchase figurines and dolls as collectibles. Collectible dolls and figurines are often displayed on shelves or in curio cabinets.

"In addition to mass produced commercially available dolls, and even more limited edition collector's dolls, there is a need for a doll which can be customized or personalized by the purchaser.

"Specifically, a mother might want a doll representative of her child at a particular age or a grandparent might want dolls representative of her grandchild(ren). The demand for customizable and personalized items bearing photographic images is evidenced by the recent increase in sales of personalized computer image T-shirts and coffee mugs.

"Additionally, an individual may want to create a figurine which is representative of a sports hero, historical figure or even a figurine which is representative of a pet."

Since dolls and figurines have been in existence for centuries there are many examples of specialized dolls in the prior art. However, none of the dolls in the prior art have customizable facial features that use an editing process to solve problems associated with creating a life-like doll.

SUMMARY OF THE INVENTION

The instant invention is a method of digitally editing a photographic image of a real-life person for attaching said image to a soft-bodied doll having a generally planar face. The process includes electronically importing the photographic image of a person by using a scanner, a digital camera, a compact disk, or an attachment to an e-mail to produce a digital image file. The image is then digitally edited using any image editor. The face is masked while the neck of the person and background of the image are deleted. A portion of the persons cheek is then sampled and lightened slightly to form a neck color which then fills in the previously deleted portion.

In a second embodiment, only the eyes, nose and mouth are masked while the rest of the image is either tinted to a chosen color corresponding to the color of fabric used in producing the doll, or erased slightly to allow the prematched background color to blend through to recolor the image. In a third embodiment, the image is lightened in color. This allows the color of the fabric used in producing the doll to bleed through the image. In this embodiment, the eyes and teeth are first whitened as much as possible. In a fourth embodiment, all areas of the photograph except the eyes, nose and mouth areas are removed and the resulting image is transferred to the face of the doll.

It is an object of the present invention to provide a life-like doll having an image of a real-life person as a face.

It is another object of the present invention to digitally edit a photograph of a person so as to create an image which is easily transformed to the face of a doll.

It is another object of the present invention to digitally edit a photograph of a person so as to create a doll having a realistic looking face without the additional image data normally associated with a photograph.

It is another object of the present invention to digitally edit a photograph of a person to convert the image into a shape which better fits a fabric pattern for a three-dimensional doll.

It is another object of the present invention to digitally edit a photograph of a person so as to create a neck portion that gives the doll a realistic life-like appearance.

These together with other objects of the invention, along with various features of novelty which characterize the invention, are pointed out with particularity in the claims annexed to and forming part of this disclosure. For a better understanding of the invention, its operating advantages and the specific objects attained by its uses, reference should be made to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
FIG. 1 is a perspective view of the doll having a face which is an image of a real-life person.
Figure 2:
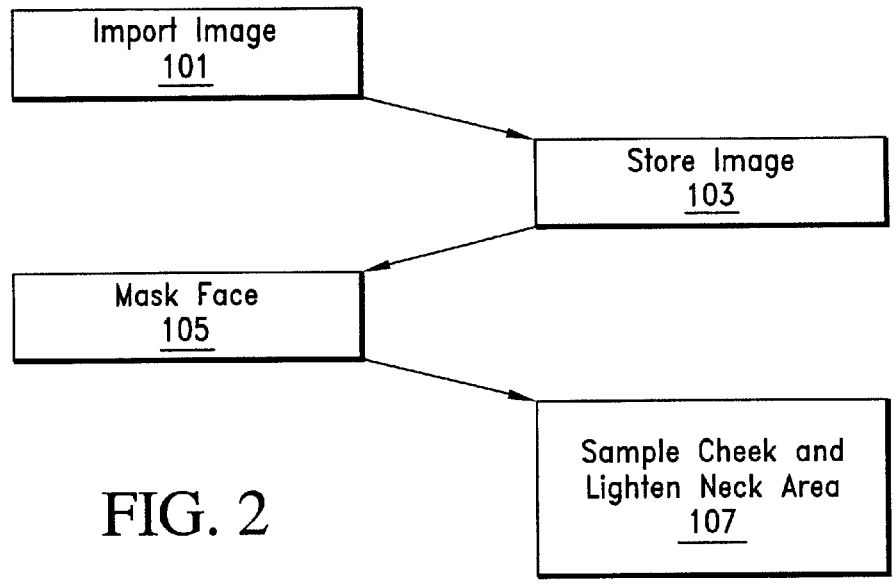
FIG. 2 is a flow chart showing the steps in the first embodiment for the method of editing a photographic image of a real-life person.

The first embodiment of the editing method is shown in FIG. 2. Step 101 includes electronically importing the photographic image of a person into a computer using a scanner, a digital camera, a compact disk, or an attachment to an e-mail. Step 103 includes storing it as an image file that can be altered by an image editing program. For example, the Adobe Photoshop editing program can be used to alter the image. Step 105 includes masking the face in an outline so as to fit the dimension of the three-dimensional doll's planar face. Step 105 is performed by tracing an outline path around the face of the digital image. The outline or path is made around the face from ear to ear, and then around the bottom of the photograph. This area is then selected thus becoming the active area.

Step 107 includes sampling the color from the face of the person in the photograph. The preferred area for sampling is the outer edge of the cheek area. The sampled color is then altered by changing its opacity to 80–90% of its original shade. This lightens the sampled color. Step 104 includes filling in the neck and background area in the image with the altered sample color taken from the face. This step includes masking the selected facial portion and making the neck and background the new active portion. In step 109, a new active portion including the neck and background is now changed to the altered sampled color taken from the face. An additional layer of 3% opacity of the sampled face color can be applied at this point to give the appearance of shadows. This layer of 3% opacity of the sampled face color can also be used to lighten the edges of the face to create a better transition area between the face and neck. Step 111 includes inverting the image horizontally. The resulting image can be printed on sheets of transfer paper. The transfer paper is then used to place the image on the cloth face of the doll.

Placement for the face has been determined by a pattern which places the chin in the center of the pattern 0.75 inches from the bottom edge. A 0.25 inch seam allowance has been included which allows for the face to be sewn to the front body section of the doll's face. The shape of the face pattern is important in the construction of the doll because the edited area of the photograph which was the background is now the neck of the doll.

Editing of a photograph in this manner keeps the original colors of the photograph and preserves the original likeness of the subject as captured by the photographer. The edited areas of the face merely allow the photograph to change from a paper medium to a fabric medium by lightening the shadowed edges not needed on a three-dimensional fabric object. The edited areas of the neck allow the photograph to fit the pattern of the doll.

A shortcoming of this embodiment is in the difficulty of having the proper color match in the body fabric available. Due to the unlimited numbers of skin tones and film colors and variations in lighting, every edited face is slightly different. Small quantities of doll faces could be edited in this manner and the body color match could be found by trial and error. If the perfect color match for the body fabric is not available locally, the color can be reproduced on sheets of transfer paper using either the color fill of the neck area or a cloned sample of the face duplicated to fill a sheet of transfer paper. The skin color can then be ironed on to white fabric to produce the skin. However, in large scale productions, fabrics would be required immediately. Dying fabrics to specifications would create perfect color matches as well as the opportunity to design fabrics that more closely resemble skin tones with highlights and mid-tones. These types of custom fabrications require large yardage minimums per color which would be impractical except in very large production situations, for example, making 10,000 dolls of one person.

Figure 3:
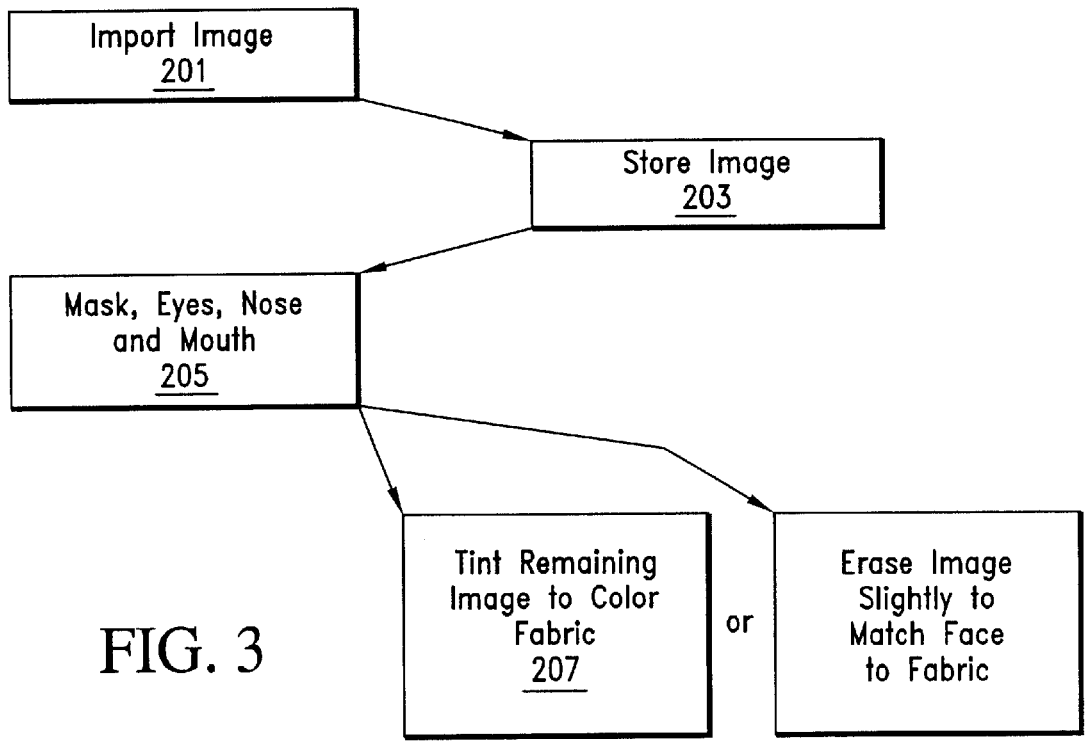
FIG. 3 is a flow chart showing the steps in the second embodiment for the method of editing a photographic image of a real-life person.

The second embodiment of the editing method is shown in FIG. 3. For large productions where every face is unique, it is more economical to choose fabrics that are already available and then edit the photograph to match the fabric color. Step 201 includes electronically importing the photograph of a real-life person into a computer by using a scanner, a digital camera, a compact disk, or an attachment to an e-mail and storing it as an image file that can be altered by an image editing program. For example, the Adobe Photoshop editing program can be used to alter the image. The image is stored on a database in Step 203. Step 205 includes masking several facial portions. The eyes, eye brows, mouth and the outline of the nose are masked. Step 207 includes protecting the masked areas while the remaining areas are altered to a color matching the fabric color chosen.

Dolls made with the editing methods of the first and second embodiment must have custom sized wigs that will follow the edge of the photograph to the mouth area. A more artistic continuation of the editing method of the second embodiment is used to create a more natural hairline that will allow the doll to use more economical ready-made wigs. After blending the edges of the face with background, the cheek area between the eye and mouth corner is blended further to totally remove the line at the edge. A color in the shadows of the cheek edge set to an opacity level of about 18% is used to extend the cheek color beyond the face edge approximately ⅜ of an inch. The color is applied with a brush tool of the editing program in an upward direction as though applying blush to the cheeks. After the doll has been sewn the face will actually have a side leaving no visible sign of the edge of the photograph. The wig will follow the hair line across the front and side temples but then taper back leaving a side facial area. The chin remains slightly visible to identify the shape of the face.

In another embodiment, an oval shape selection tool is used to achieve the same result. The oval shaped selection tool includes a feathered edge set at 10 pixels. The tool is used to select the area in the face of the original photo which contains the eyebrows, eyes, nose, mouth and chin. The selected area is corrected, if necessary, with a quick mask and dragged to a new background that is the color of the doll body. A quick mask shows the masked area as red and can be reduced by painting with white, or enlarged by painting with black. This method also removes the edges of the face so that the doll can wear a normal wig, but requires less painting skills.

In manufacturing settings, it is necessary to have the doll finished before the face is applied. Having to finish the face before the doll can be sewn would be too slow and too difficult to supervise, especially if the doll is being made a distance away from where the face editing is taking place. Faces edited with the method of the first and second embodiments can be applied to a finished doll if first ironed onto special paper called DFOM-10, then cut out around the perimeter of the face and neck area and ironed to the center of the face area of the doll. Also, a hood with the edited face could be pulled on over a finished doll and fused in place.

Figure 4:
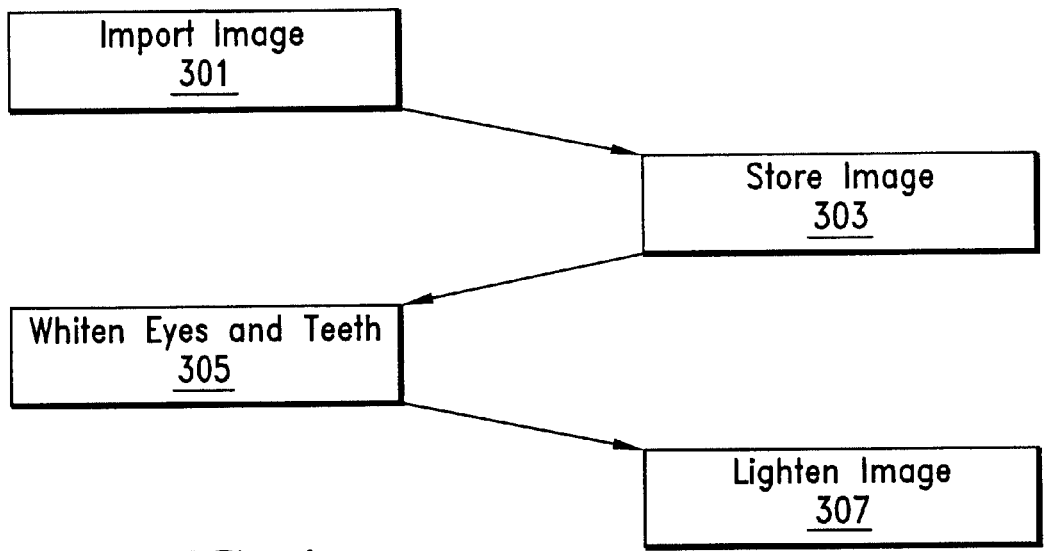
FIG. 4 is a flow chart showing the steps in the third embodiment for the method of editing a photographic image of a real-life person.

The third embodiment of the editing method is shown in FIG. 4. Step 301 includes importing the photograph of a person (person could be deceased) into the computer by using a scanner, a digital camera, a compact disk, or an attachment to an e-mail. Step 303 includes storing this image on a database. Step 305 includes selecting the eye and teeth areas. In step 305, the selected areas are brightened in preparation for placing the face on the doll. Step 307 involves lightening the image before application to the doll's face. The image is flipped horizontally then printed out. It is cut out and ironed directly to the face of the doll. The face is centered with the mouth placed at the neck seam area. This doll needs the custom fitted wig. However, when the edge of the face between the eye and mouth corner is softened and the extended cheek shading is added, the doll can wear a ready-made wig. The extended cheek area has a wide feathered edge to more effectively blend with the fabric in the side area.

These same results can be achieved by selecting the area of the face in the original photo with the eyebrows, eyes, nose, mouth and chin using an oval tool. The oval tool has a feathered edge of approximately ten pixels. The area of the face, once selected, is dragged to a clear background. After the image has been flipped and ironed directly to the fabric, it blends with the fabric color and removes the edge of the face.

Figure 5:
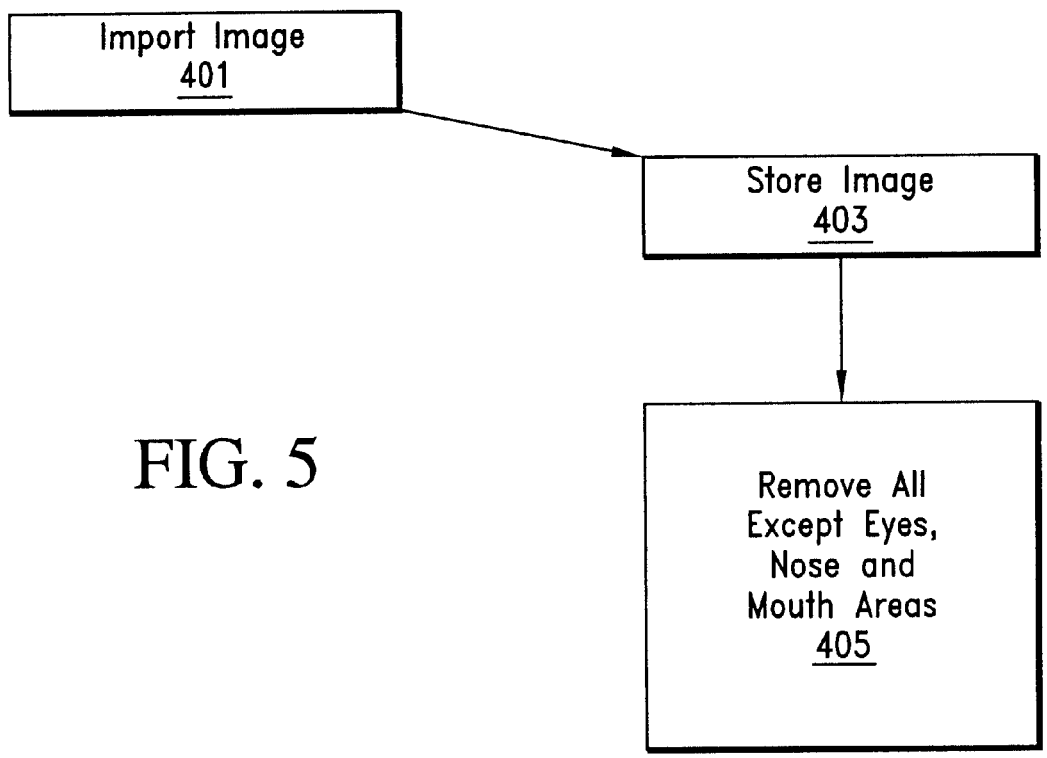
FIG. 5 is a flow chart showing the steps in the fourth embodiment for the method of editing a photographic image of a real-life person.

The fourth embodiment of the editing method is shown in FIG. 5. In step 401, as above, the image of a person is electronically imported into the computer using either, a scanner, a digital camera, a compact disk, or an attachment to an e-mail. Step 403 includes storage of the scanned image on a database. In step 405 all areas of the photograph except for the eyes, nose and mouth areas are removed. By using the highlight—color range option and resulting quick mask in the Adobe editing program—the eyes and mouth are darkened to 100% black opacity. The nose is darkened with varying degrees of opacity of black, or shades of gray. These degrees fade from black at the bottom of the nose to 50% opacity of black at the middle of the nose to a gradual decrease of 18% opacity of black where the nose joins the face between the eyes. The remaining face area is cleared of any other mask color. After the mask mode has been turned off, the selected area that was not masked is highlighted by a marquee and is deleted. Using the outline of the face from the copied photograph, the transparent face shape with true features is cut out and ironed onto the finished doll. The mouth is centered with the center area parallel to the neck seam. It will be apparent to those skilled in the art that various modifications and variations can be made to the editing method. Thus, it is intended that the present invention cover such modifications and variations, provided they come within the scope of the appended claims and their equivalents. The disclosure of all publications cited above are expressly incorporated herein by reference in their entireties to the same extent as if each were incorporated by reference individually.

I claim:

1. A method of digitally editing a photographic image of a person having a facial portion including eyes, a nose and a mouth and a non-facial portion for attaching the image to a doll having a face for receiving the image, comprising:

providing fabric for the face of the doll having a color which is different from the skin color of the person in the photographic image;

electronically importing the photographic image of a person by using a scanner, a digital camera, a compact disk, or an attachment to an e-mail to produce a digital image file;

saving the digital image file in computer memory;

editing the digital image file by masking the eyes, nose and mouth of the facial portion, sampling the color of the fabric provided for the body of the doll and altering the remainder of the facial portion and the non-facial portion to the sampled color of the fabric by either adding approximately 0.25 opacity of the sample color to the unmasked area or erasing portions of the face with various degrees of opacity allowing the color of the fabric to blend through the facial image;

horizontally flipping the image;

printing the image onto transferable paper; and transferring the image onto dark fabric opaque material medium and then to the doll having a face for receiving the image.

2. The method of claim 1, wherein said altering step of said editing step includes dragging the remainder of the facial portion and the non-facial portion to a new background which is the color of the doll.

3. The method of claim 1, wherein said altering step of said editing step includes dragging the selected facial area to a new layer with a clear background.

* * * * *

UNITED STATES PATENT AND TRADEMARK OFFICE
CERTIFICATE OF CORRECTION

PATENT NO.   : 6,782,128 B1
DATED        : August 24, 2004
INVENTOR(S)  : Diane Rinehart It is certified that error appears in the above-identified patent and that said Letters Patent is hereby corrected as shown below:

Column 3,
Line 49, delete "Step 104 includes"
Delete lines 50-59
Lines 60-61, delete "Step 111 includes inverting the image horizontally."

Signed and Sealed this

Nineteenth Day of October, 2004

JON W. DUDAS
*Director of the United States Patent and Trademark Office*